(12) United States Patent
Li et al.

(10) Patent No.: US 11,027,498 B2
(45) Date of Patent: Jun. 8, 2021

(54) ULTRASONIC WELDING OF DISSIMILAR SHEET MATERIALS

(71) Applicant: GM Global Technology Operations LLC, Detroit, MI (US)

(72) Inventors: Yongqiang Li, Sunnyvale, CA (US); Shixin Hu, Ann Arbor, MI (US); Daniel Shriver, Ann Arbor, MI (US); Kaifeng Wang, Ann Arbor, MI (US); Mihaela Banu, Ann Arbor, MI (US); Jorge F. Arinez, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 263 days.

(21) Appl. No.: 15/991,367

(22) Filed: May 29, 2018

(65) Prior Publication Data

US 2018/0272618 A1   Sep. 27, 2018

Related U.S. Application Data

(62) Division of application No. 15/184,085, filed on Jun. 16, 2016, now abandoned.

(51) Int. Cl.
*B32B 37/00* (2006.01)
*B29C 65/60* (2006.01)
(Continued)

(52) U.S. Cl.
CPC ............ *B29C 65/606* (2013.01); *B23K 20/10* (2013.01); *B23K 20/22* (2013.01); *B29C 65/08* (2013.01); *B29C 65/561* (2013.01); *B29C 65/607* (2013.01); *B29C 65/608* (2013.01); *B29C 65/64* (2013.01); *B29C 65/8215* (2013.01); *B29C 66/02241* (2013.01); *B29C 66/1122* (2013.01); *B29C 66/21* (2013.01); *B29C 66/304* (2013.01); *B29C 66/3032* (2013.01);
(Continued)

(58) Field of Classification Search
USPC ....................................................... 156/73.1
See application file for complete search history.

(56) References Cited

U.S. PATENT DOCUMENTS 8,250,725 B2 * 8/2012 Sigler ................. B29C 37/0085
156/293

OTHER PUBLICATIONS

Ali Yousefpour et al., "Fusion Bonding/Welding of Thermoplastic Composites", Journal of Thermoplastic Composite Materials, vol. 17, Sage Publications, Jul. 2004.

* cited by examiner

Primary Examiner — James D Sells

(57) ABSTRACT

A ultrasonic welding method of joining dissimilar-material workpieces, such as sheet materials, and the joined components formed thereby. The method includes applying ultrasonic energy to a thermoplastic piece to fill a hole of a dissimilar piece to form a weld point that is made up with polymer from the thermoplastic piece. In general, the geometry of the thermoplastic piece is not altered during the process. The dissimilar piece generally has a higher melting temperate and can be metal, thermoset polymers, or other thermoplastic material. The welded pieces can be arranged in a lap, laminate, or double lap configuration. In some embodiments, the hole of the dissimilar sheet material includes undercut features that improve the mechanical interlock between the dissimilar pieces. In some embodiments, the weld point has a mushroom cap to improve mechanical interlock.

10 Claims, 10 Drawing Sheets

(51) Int. Cl.
*B29C 65/56* (2006.01)
*B29C 65/64* (2006.01)
*B29C 65/82* (2006.01)
*B29C 65/00* (2006.01)
*B23K 20/22* (2006.01)
*B23K 20/10* (2006.01)
*B29C 65/08* (2006.01)
B23K 103/04 (2006.01)
B23K 103/10 (2006.01)
B23K 103/18 (2006.01)
B23K 103/00 (2006.01)
B29C 65/48 (2006.01)
B29C 65/72 (2006.01)
B29C 65/02 (2006.01)
B29K 101/12 (2006.01)
B29K 705/00 (2006.01)
B29K 23/00 (2006.01)
B29K 67/00 (2006.01)
B29K 71/00 (2006.01)
B29K 79/00 (2006.01)
B29K 81/00 (2006.01)
B29K 277/00 (2006.01)

(52) U.S. Cl.
CPC ........ *B29C 66/30325* (2013.01); *B29C 66/43* (2013.01); *B29C 66/712* (2013.01); *B29C 66/7212* (2013.01); *B29C 66/72143* (2013.01); *B29C 66/7392* (2013.01); *B29C 66/7394* (2013.01); *B29C 66/73116* (2013.01); *B29C 66/73921* (2013.01); *B29C 66/742* (2013.01); *B29C 66/7422* (2013.01); *B29C 66/81425* (2013.01); *B29C 66/81431* (2013.01); *B29C 66/8322* (2013.01); B23K 2103/05 (2018.08); B23K 2103/10 (2018.08); B23K 2103/18 (2018.08); B23K 2103/42 (2018.08); B29C 65/02 (2013.01); B29C 65/48 (2013.01); B29C 65/4895 (2013.01); B29C 65/562 (2013.01); B29C 65/72 (2013.01); B29C 66/71 (2013.01); B29C 66/73755 (2013.01); B29C 66/74283 (2013.01); B29C 66/81423 (2013.01); B29C 66/929 (2013.01); B29C 66/939 (2013.01); B29C 66/949 (2013.01); B29C 66/9513 (2013.01); B29C 66/9517 (2013.01); B29K 2023/12 (2013.01); B29K 2067/046 (2013.01); B29K 2071/00 (2013.01); B29K 2079/08 (2013.01); B29K 2081/04 (2013.01); B29K 2101/12 (2013.01); B29K 2277/10 (2013.01); B29K 2705/00 (2013.01)

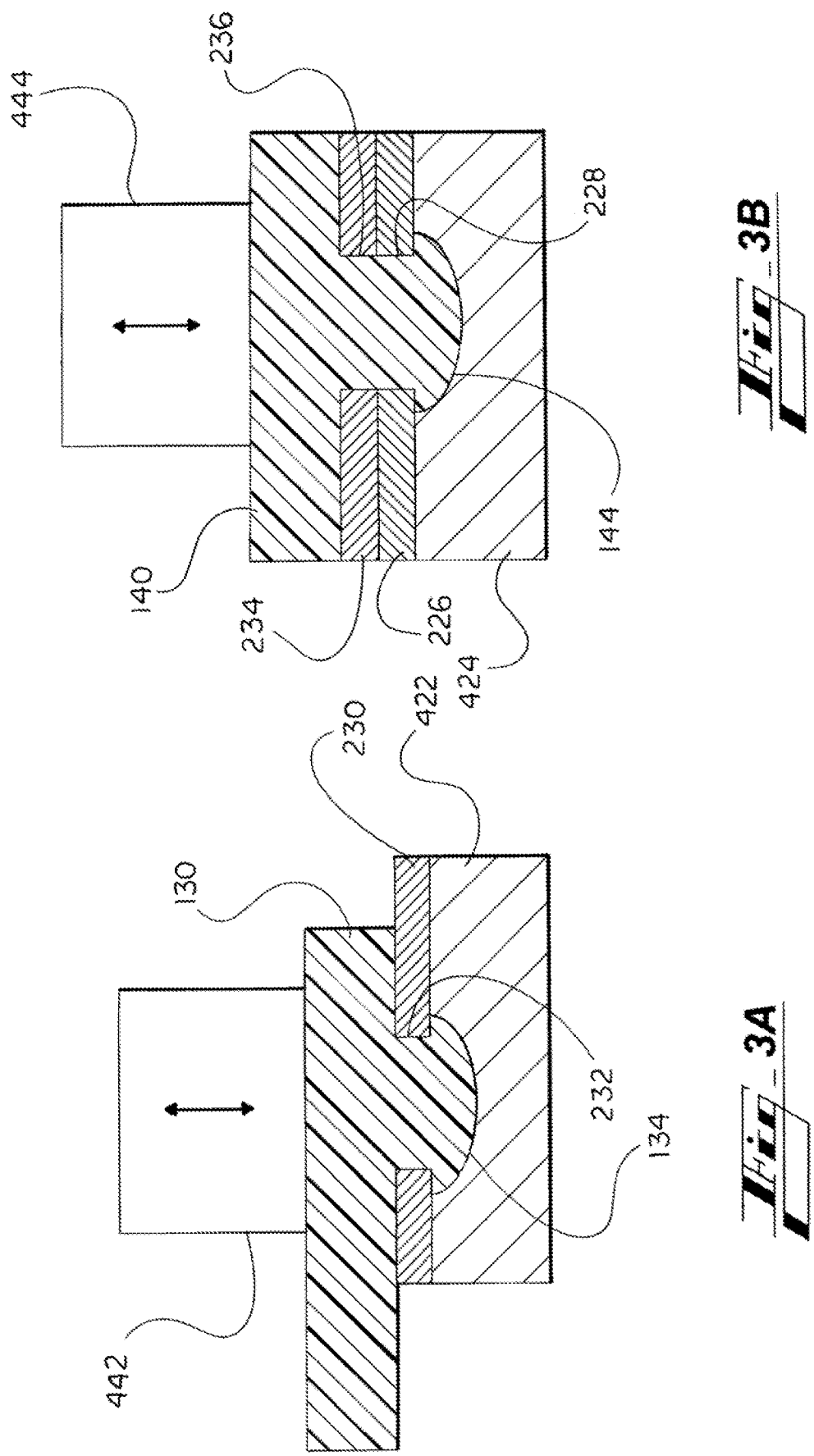

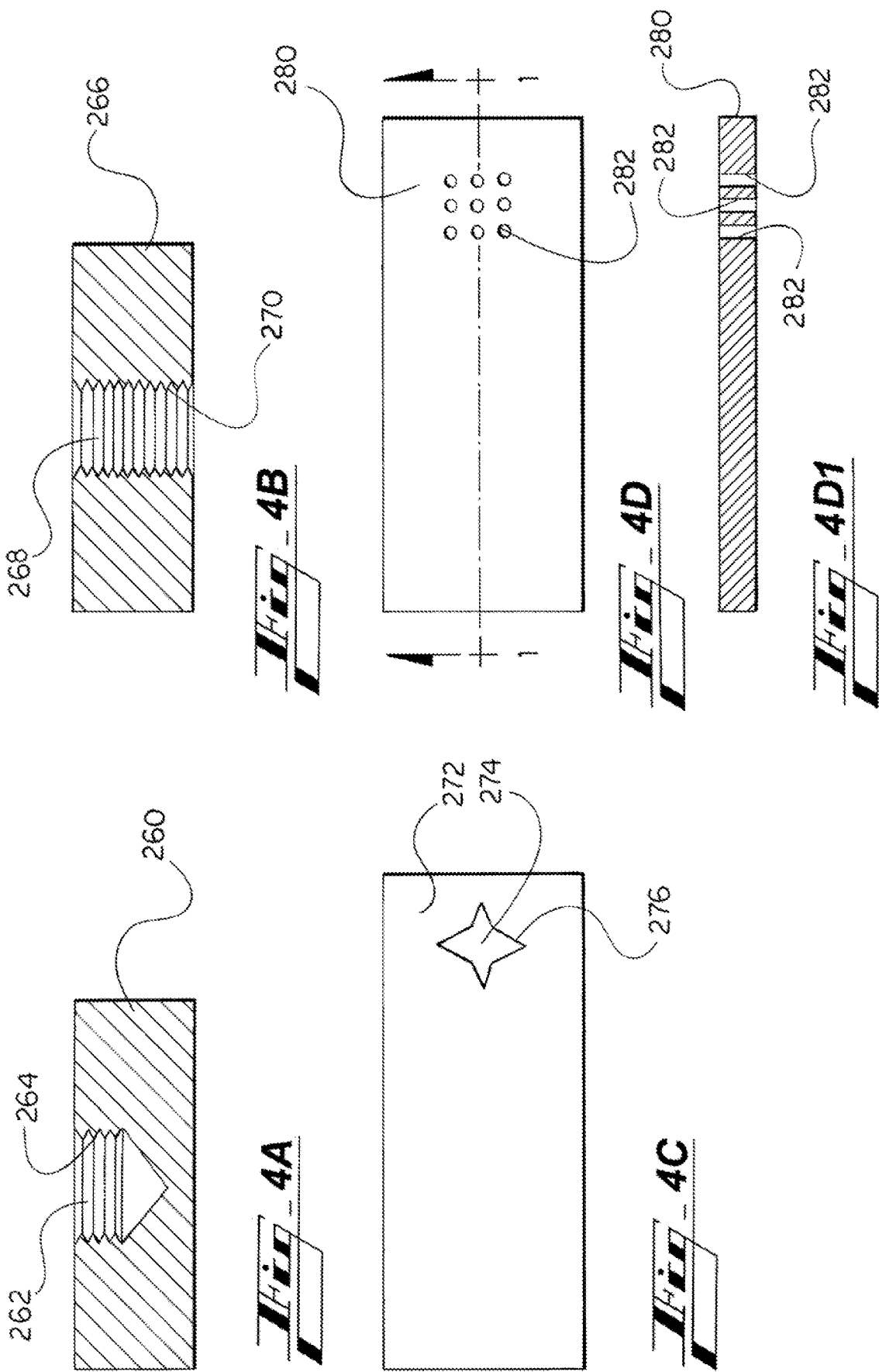

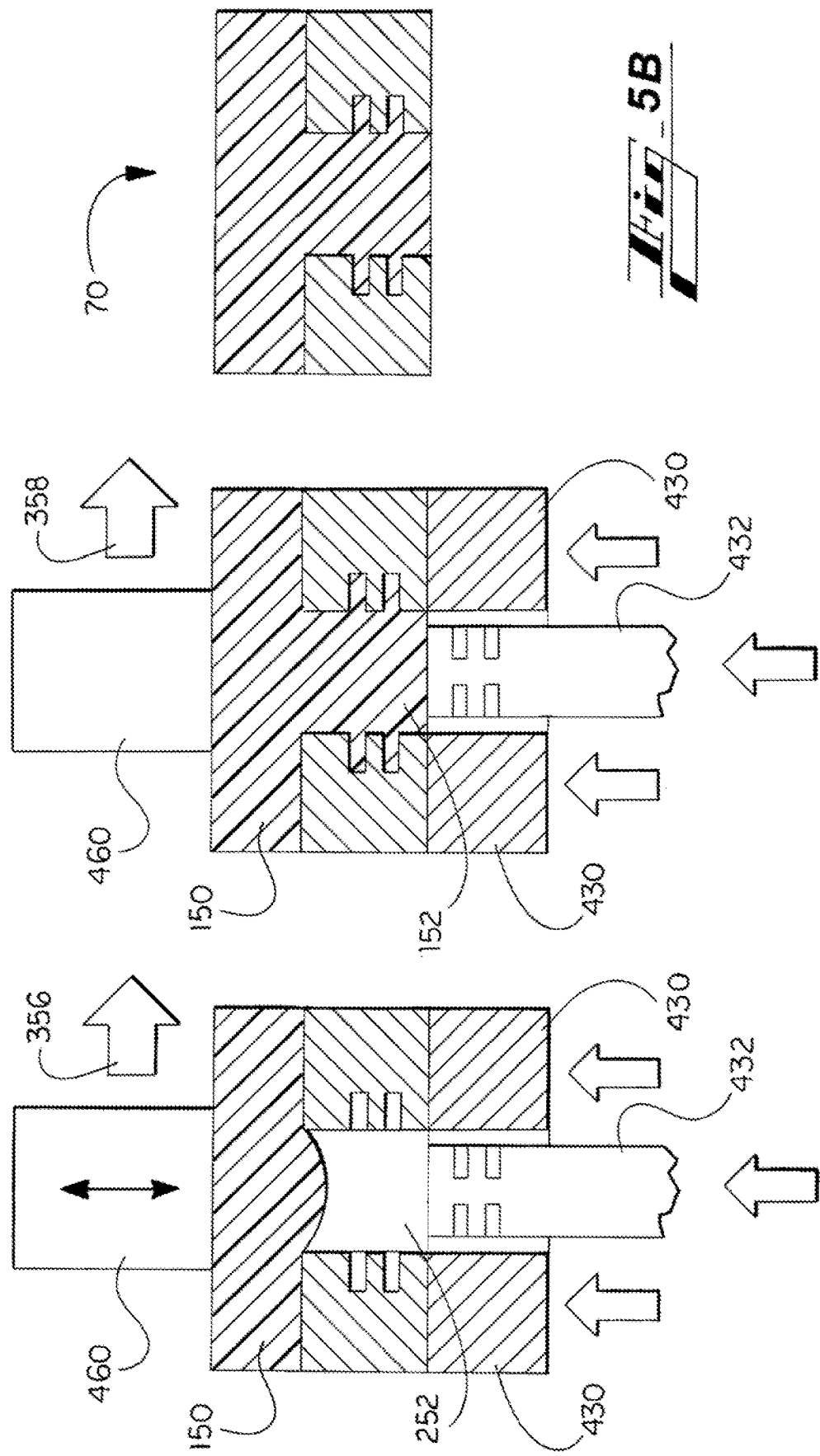

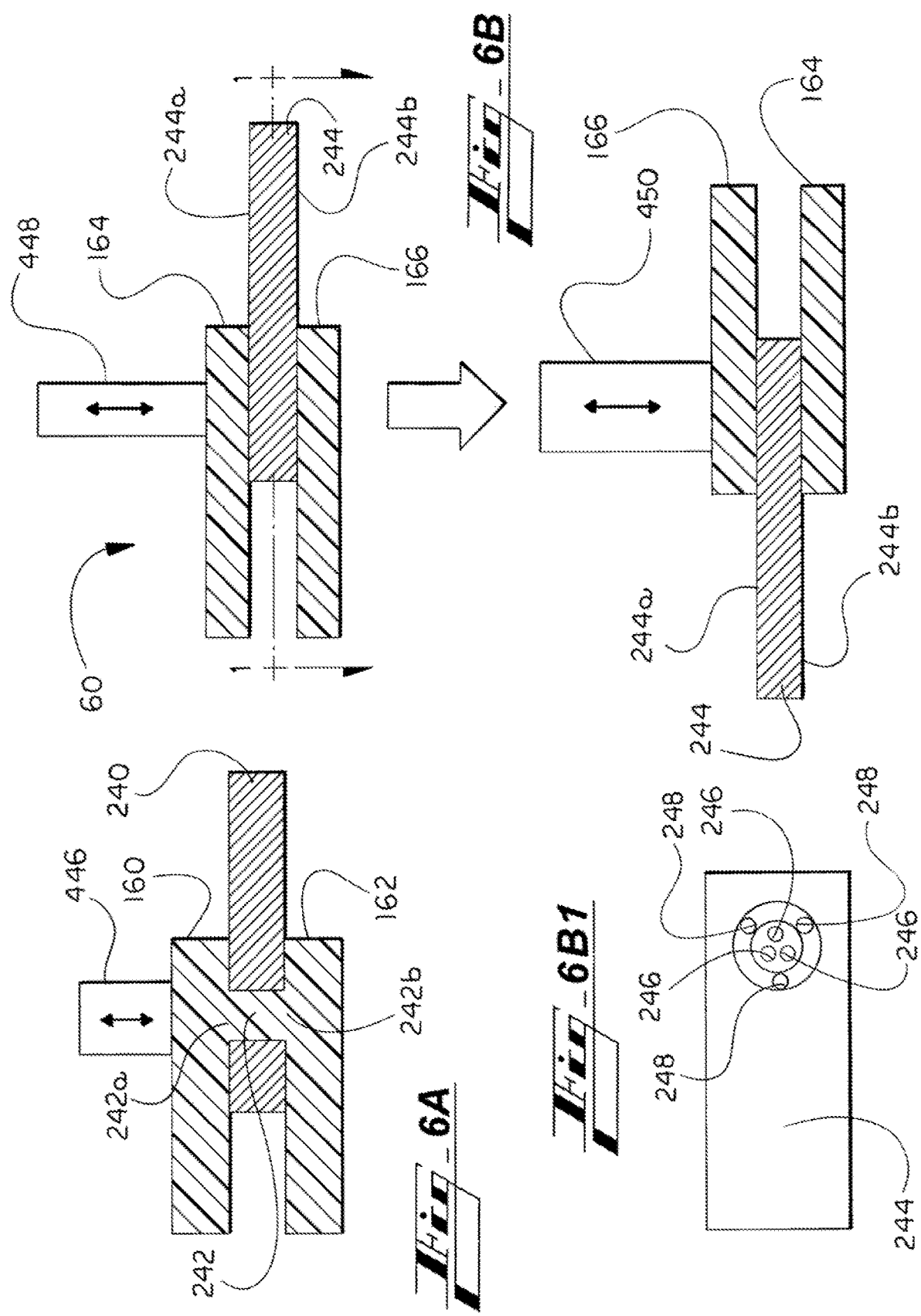

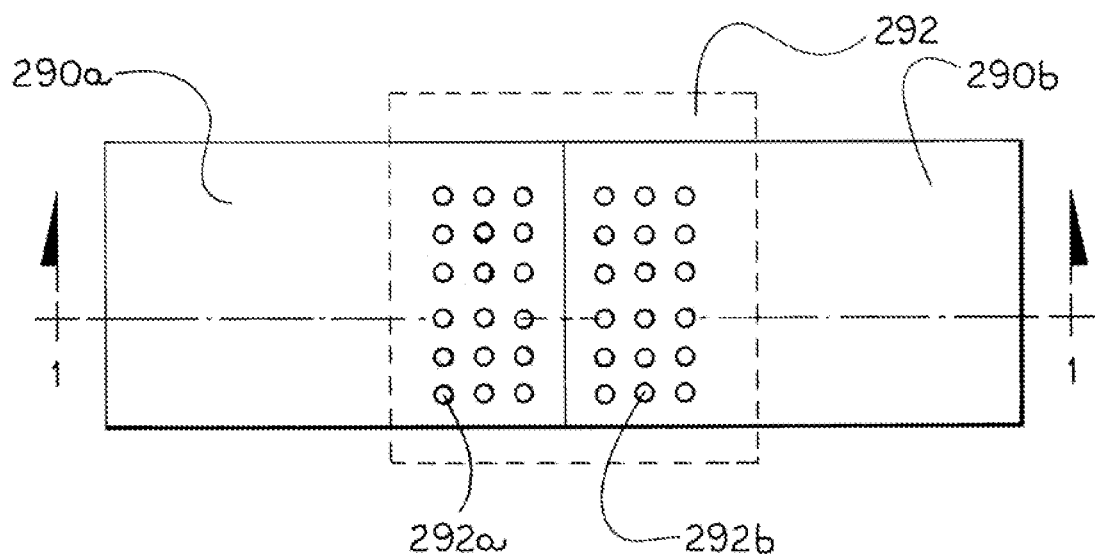
Fig_7A
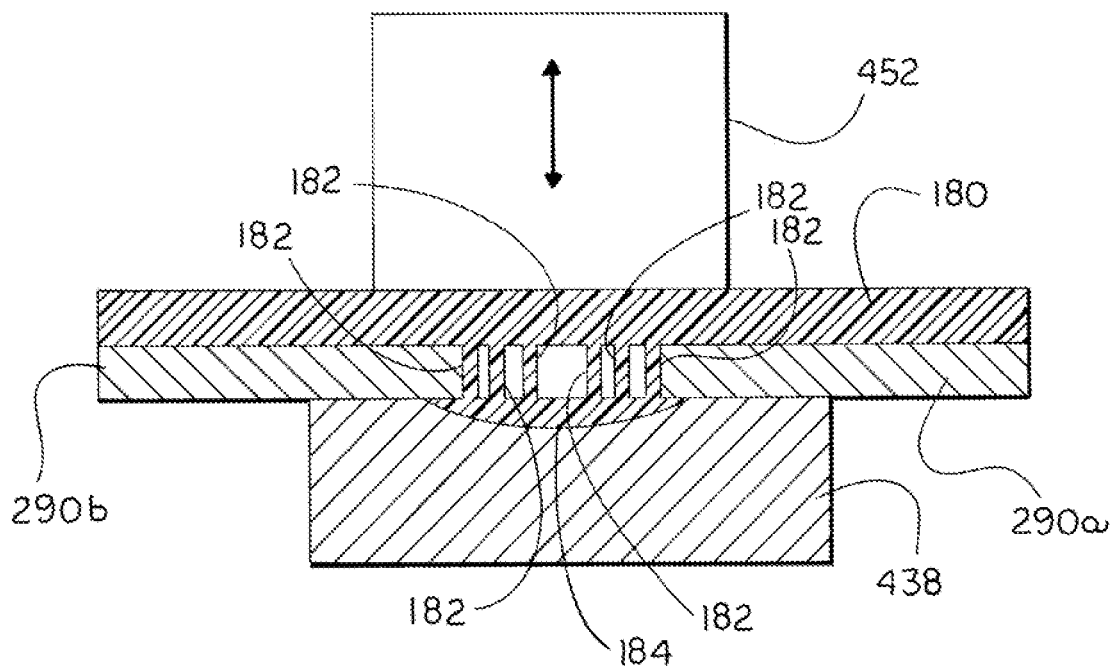
Fig_7B

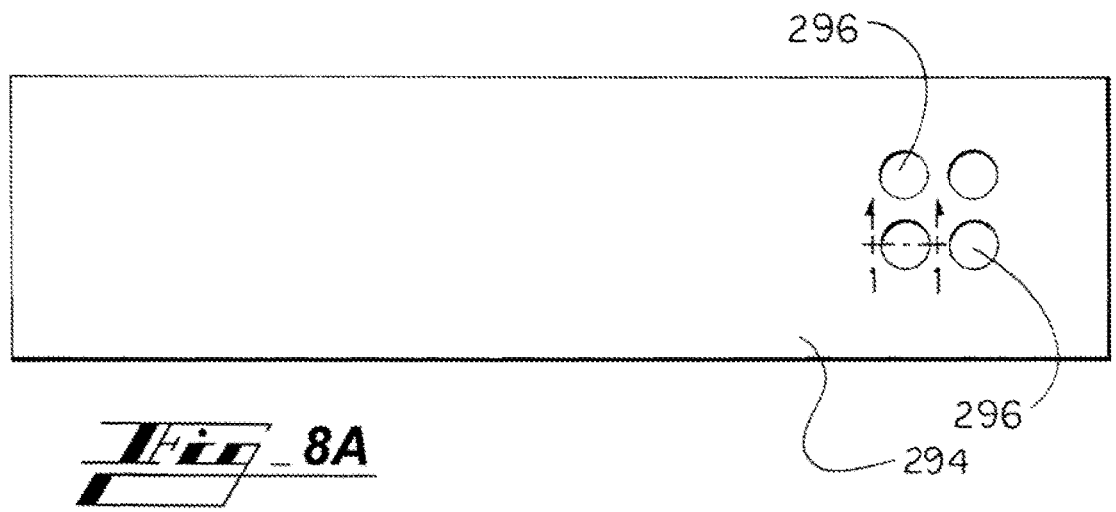
FIG. 8A
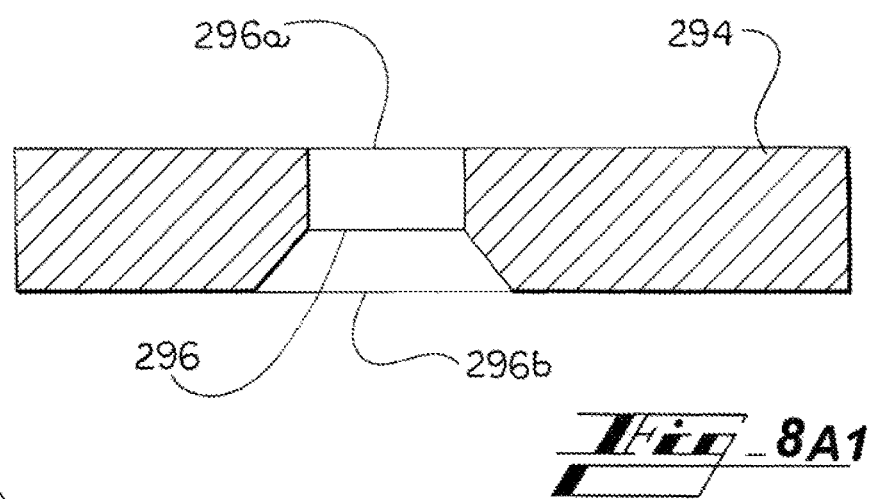
FIG. 8A1
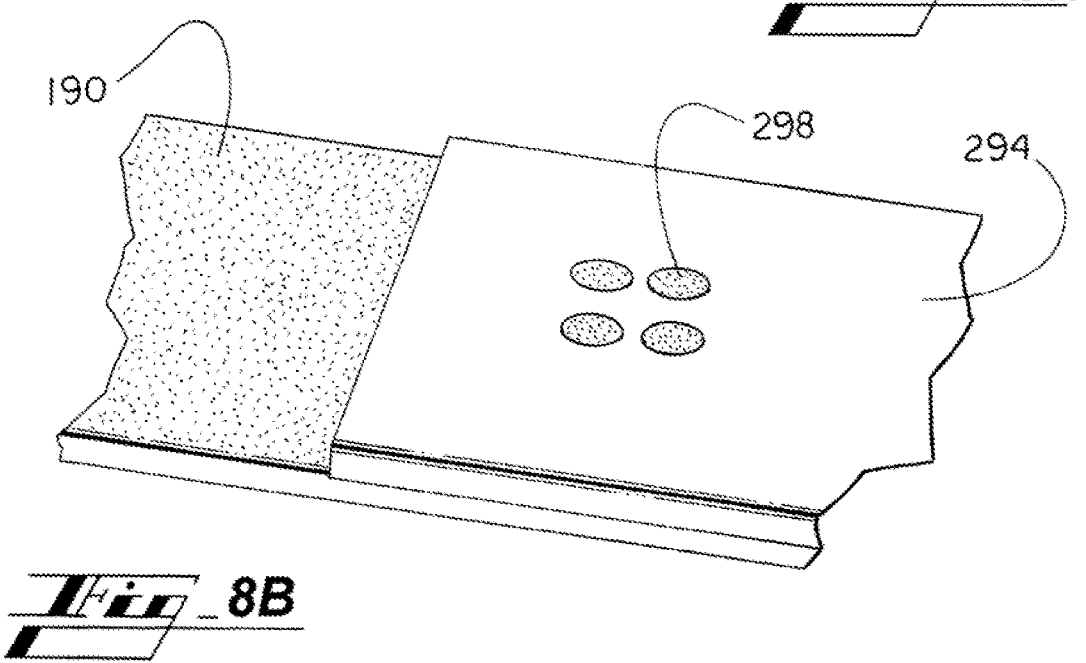
FIG. 8B

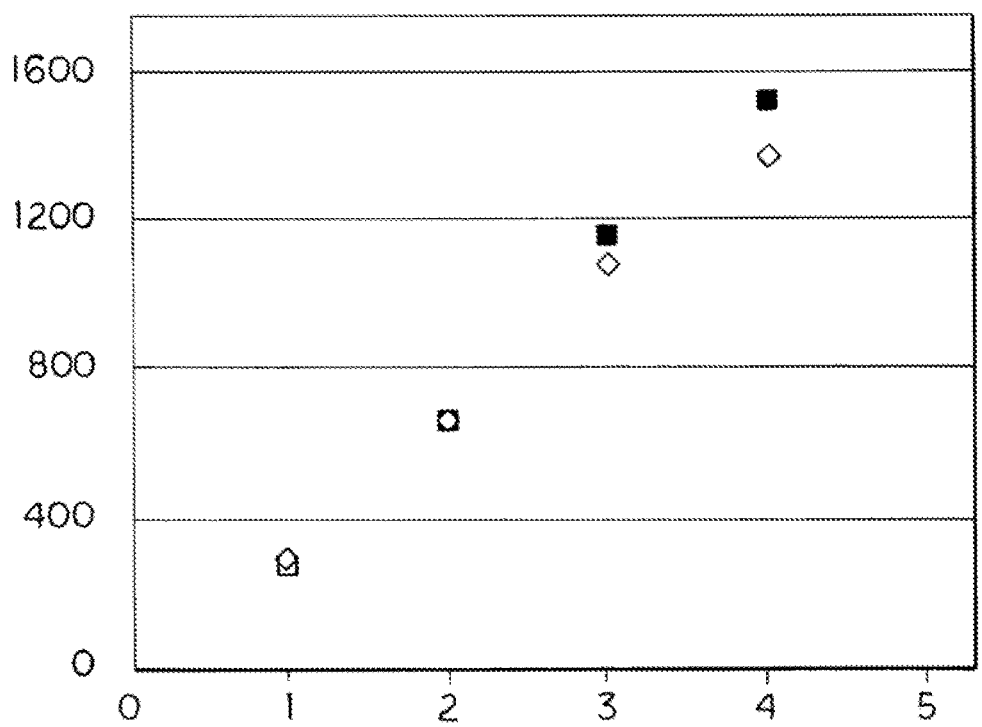
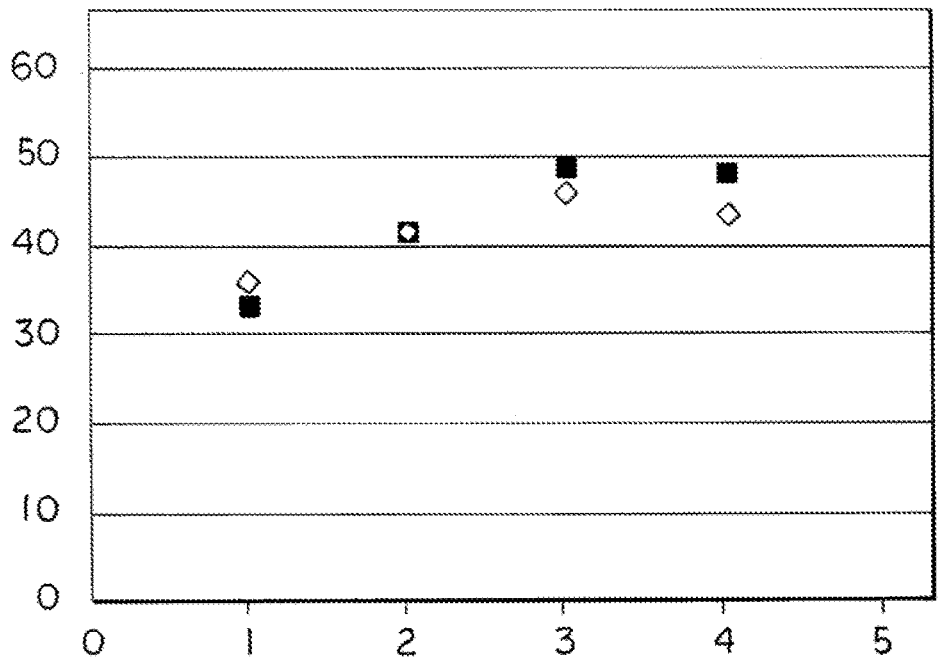

ULTRASONIC WELDING OF DISSIMILAR SHEET MATERIALS

TECHNICAL FIELD

The present disclosure relates generally to ultrasonic welding and, more particularly, to a welded piece created by joining dissimilar sheet materials and the process of creating the welded piece.

BACKGROUND

Welding is a common way to join similar and dissimilar materials in a wide range of industries, including consumer electronics, home products and appliances, farming, construction equipment, transportation systems, and the like.

The dissimilar materials can include dissimilar metals, dissimilar polymers, or combinations of polymers and metals. The manufacturer can select favorable characteristics, such as being lightweight, highly-conformable or shapeable, strong, durable, or having a desired texture or color by combining some polymer or composite materials with other materials. An article of manufacture may include various components (exterior, interior, or decorative features) where materials are selected and configured to withstand a hot and/or chemically aggressive environment or for painting or chemical resistance over time.

With the increased use of polymers and other low-mass materials, compression molding and post-mold joining techniques, such as laser welding and ultrasonic welding, are also being used more commonly. Some workpieces, including polymer composites, have relatively low melting points, and some workpieces, including metals, have relatively high conductivity. Whether welding one or both types of workpiece, it is difficult and in many cases impossible to join the workpieces at a target interface accurately, quickly, and with minimal melting of other portions of the workpieces.

Traditional ultrasonic welding techniques such as heat staking have various shortcomings. With reference to the figures, and more particularly the first figure, FIG. 1 shows a heat staking process joining a thermoplastic piece 110 with a metal piece 210 to form a lap joint. The thermoplastic piece 110 comprises a boss 112 operably connected to the body of the thermoplastic piece. The boss and body combination of the thermoplastic piece 110 are obtained for example by molding, such as injection molding. The metal piece 210 comprises a through hole 212, which can be obtained through drilling a hole into the metal piece. Next, the metal piece 210 is assembled 310 with the thermoplastic piece 110 by aligning and then fitting the boss 112 and the through hole 212 prior to heat staking. The stacked piece 10 is then subject to a heat staking process 312 using a concave anvil 410 to form a mushroom cap 114 from the boss 112. The mushroom cap 114 generally has a diameter that is larger than the diameter of the hole 212 such that the interaction of the mushroom cap 114 and the hole 212 provides mechanical interlock to hold the two pieces 110, 210 together to form a welded piece 20.

The hole 212 of the metal piece is a straight hole without undercut features. Because the boss 112 has to be fit into the hole 212, there is a space 214 between the thermoplastic piece and the metal piece prior to the heat staking process. Because the heat staking process is directed to forming the mushroom cap, the space 214 between the boss and the hole still exists after the heat staking process.

The technique has shortcomings including, and not limited to, relatively high labor and other cost associated with formation of thermoplastic pieces by injection molding. Because the geometry of the thermoplastic piece is complicated by the boss, molds having corresponding features have to be made to accommodate the boss.

SUMMARY

The present technology relates to an ultrasonic welding technique including applying ultrasonic energy to thermoplastic polymer in a sheet material to fill existing hole(s) in a dissimilar sheet material. The dissimilar sheet material has a melting/softening temperature that is higher than the thermoplastic sheet material. The polymer from the sheet material that filled the hole of the dissimilar sheet material forms a weld point to create mechanical interlock between the two sheets.

The disclosed method enables joining of a thermoplastic composite with dissimilar sheet material without using a fastener. It reduces complexity and cost associated with molding and handling of the boss-bearing thermoplastic piece of traditional ultrasonic heat staking.

Benefits of the technique include, and are not limited to, reduced overall production time and cost in joining dissimilar sheet materials. And a variety of joints can be formed with the technique disclosed herein.

Time and cost are saved, for instance, because a special mold is not needed to create a boss-bearing thermoplastic piece. The previous need of producing various thermoplastic pieces, having a variety of boss configurations, has been replaced with much simpler and cost-effective approaches, in various embodiments including drilling or punching holes in the dissimilar piece. The ultrasonic welding of dissimilar sheet materials disclosed herein supports lightweight strategy in vehicle manufacturing through mixed materials joining.

Other aspects of the present technology will be in part apparent and in part pointed out hereinafter.

DESCRIPTION OF THE DRAWINGS

FIG. 3A is a diagram illustrating a cross sectional side view of a thermoplastic piece being welded together with a metal piece using a concave anvil and a sonotrode.

FIG. 3B is a cross sectional side view of a thermoplastic piece being welded together with a first metal piece and a second metal piece using a concave anvil and a sonotrode.

FIG. 4A is a cross sectional side view of a blind hole with internal thread as an undercut feature in a metal piece.

FIG. 4B is a cross sectional side view of a through hole with internal thread as an undercut feature in a metal piece.

FIG. 4C is a top view of a hole with a number of slots in a metal piece to increase polymer-metal binding area.

FIG. 4D is a top view of an array of through holes in a metal piece to increase polymer-metal binding strength.

FIG. 4D1 is a cross sectional side view of the metal piece of FIG. 4D along the 1-1 line.

FIG. 5B is a diagram illustrating the second half of the process of FIG. 5A.

FIG. 6A is a cross sectional side view of a metal piece being sandwiched and joined with two thermoplastic pieces through applying ultrasonic energy to one of the thermoplastic pieces.

FIG. 6B is a diagram illustrating a side view of a two-step process of a metal piece being sandwiched and joined with two thermoplastic pieces.

FIG. 6B1 is a cross sectional top view of the metal piece of FIG. 6B along the 1-1 line.

FIG. 7A is a top view of two butting metal pieces with an array of small holes.

FIG. 7B is a cross sectional side view of the two butting metal halves of FIG. 7A, taken along the 1-1 line, being ultrasonically welded with a thermoplastic piece on a concave anvil.

FIG. 8A is a top view of a sample metal piece having a 2×2 array of through holes.

FIG. 8A1 is a cross sectional side view of the metal piece of FIG. 8A along the 1-1 line.

FIG. 8B is a photo of the four-hole metal piece of FIG. 8A joined with a thermoplastic piece.

FIG. 9A shows max load data, for the four example welded pieces, plotted against the number of weld point(s) in each piece.

FIG. 9B shows shear strength, of the joints of all four welded pieces, plotted against the number of weld point(s) in each piece.

DETAILED DESCRIPTION

Figure 1:
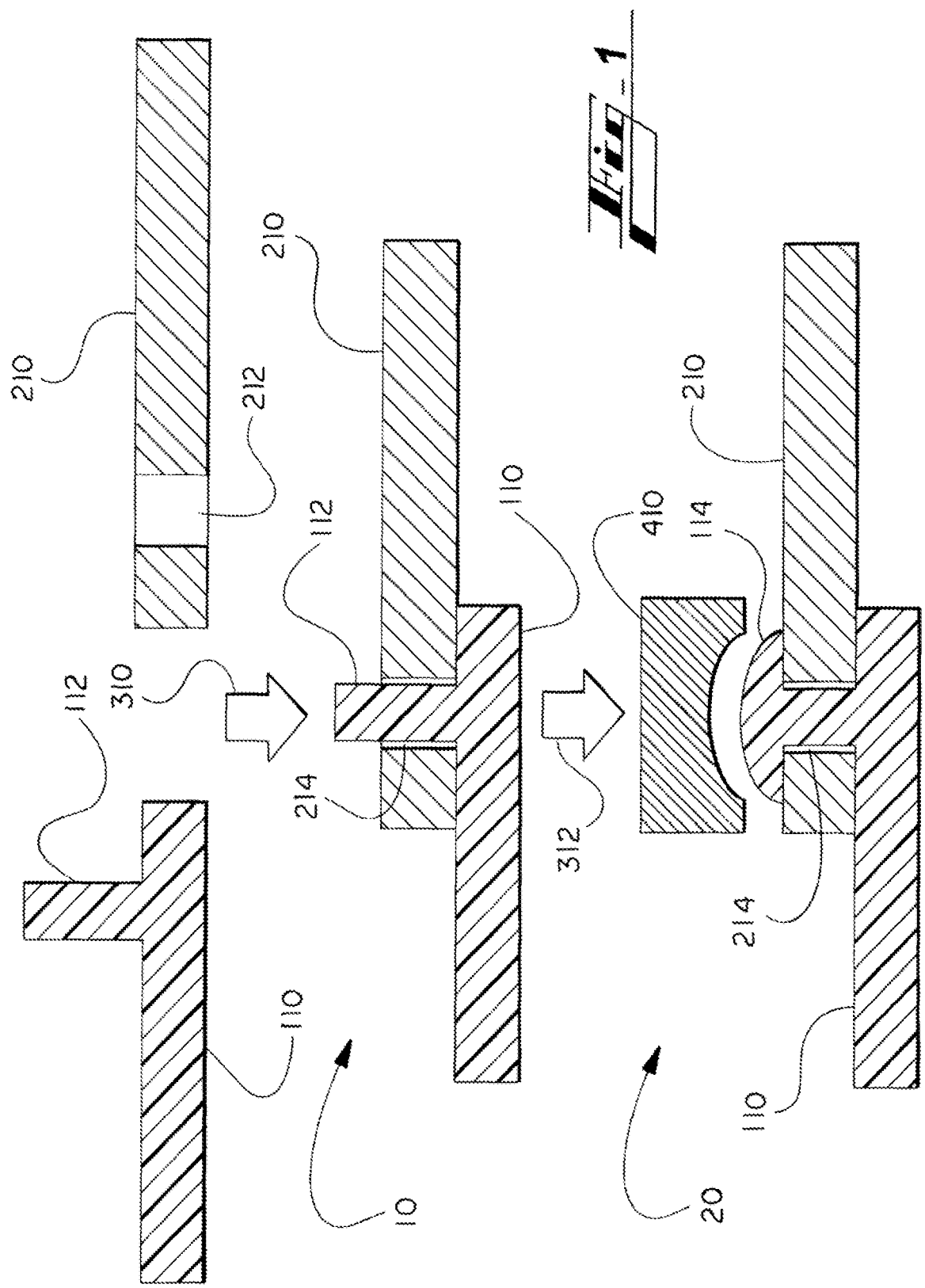
FIG. 1 is a diagram illustrating a process of joining two pieces of dissimilar sheet materials by a heat staking process.

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, microprocessor-based electronics, combinations thereof, and the like. In certain embodiments, some or all operations (e.g., controlling horn movement and energy application) are performed by, or at least initiated by a computing device, such as a processor executing computer-executable instructions stored or included at a computer-readable medium.

And any one or more steps of the process can be performed, initiated, or otherwise facilitated by automated machinery, such as robotics.

I. GENERAL OVERVIEW OF THE DISCLOSURE

The present disclosure describes an ultrasonic welding technique for joining dissimilar-material workpieces, such as a thermoplastic composite and a metal.

The method comprises applying ultrasonic energy to a thermoplastic piece to fill an existing hole of a dissimilar piece, such as metal, to form a weld point. The weld point comprises polymer from the thermoplastic piece and provides mechanical interlock between the dissimilar materials. In various embodiments, two pieces are joined. In other embodiments, three or more pieces are joined.

In general, the second, dissimilar-material workpiece has a melting/softening temperature that is higher than the thermoplastic workpiece. Example materials for the second workpiece include metal, thermo-set composites, and other thermoplastics having a higher melting temperature than the first, thermoplastic workpiece. The workpieces being joined are referred to at times herein as sheets, but are not limited to being a sheet or to any specific geometry. The workpieces can have any of a wide variety of shapes and sizes allowing performance of the present technology. Throughout the present disclosure, the second, dissimilar-material is also at times referred to as the higher melting temperate (HMT) sheet or piece.

The system components, algorithm, and operations are described further below with reference to the figures.

II. PROCESS, SYSTEM COMPONENTS, AND WORKPIECES—FIGS. 2-9B

The present technology is now described with reference to example systems, tooling, and workpieces. The figures are referenced to facilitate understanding of the technology, and not to limit scope thereof.

Reference to directions herein, such as upper, lower, up, down, and lateral, are provided to facilitate description of the present technology but does not limit scope of the technology. A description in which a horn is described as descending down upon a proximate workpiece is not limited, for example, to the horn moving vertically downward in the earth, or environment, frame. The horn in this case can be moving from left to right, for example, in the environment frame.

Figure 2:
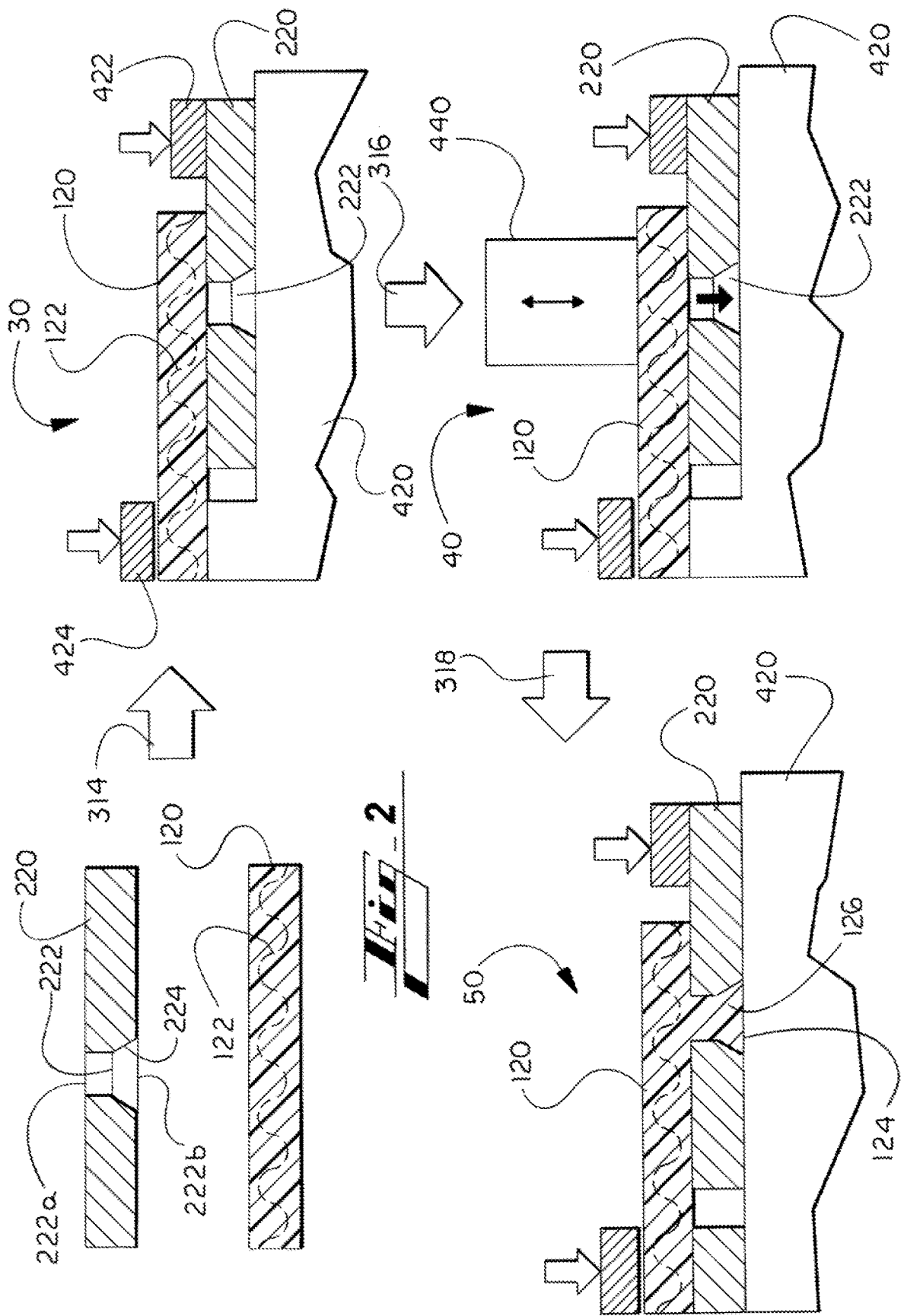
FIG. 2 is a diagram illustrating a process of joining two pieces of dissimilar sheet materials by an ultrasonic welding process according to one embodiment of the present disclosure.

Turning again to the figures, and more particularly, to FIG. 2, an ultrasonic welding process according to one embodiment of the technology is shown. The process joins a first, e.g., thermoplastic, piece 120 with a second, e.g., metal, piece 220 to form a lap joint. Specifically, the metal piece 220 comprises a through hole 222 that has a step undercut feature 224, a top opening 222a, and a bottom opening 222b. The step undercut feature 224 advantageously gives the hole 222 a smaller (e.g., smaller diameter) top opening 222a than bottom opening 222b. The thermoplastic piece 120 is thermoplastic composite that comprises embedded fibers 122 having a length that is less than 50% of the diameter of the top opening 222a. The pieces 120, 220 are then assembled 314 on a flat anvil 420 such that the thermoplastic piece 120 is overlaid on top of the metal piece 220, covering the hole 222, with the top opening 222a immediately below the thermoplastic piece and the bottom opening 222b immediately above the surface of the flat anvil. The stacked pieces 30 are in various embodiments further secured with clamps 422 and 424.

A welding horn or sonotrode 440 is placed 316 on the thermoplastic piece 120 directly above the openings 222a and 222b in the third arrangement or step 40. The welding horn or sonotrode 440 in various embodiments has a lateral size, e.g., diameter, being larger than the top and bottom openings 222a and 222b. Ultrasonic energy is applied by way of the sonotrode 440 to melt or soften the thermoplastic to fill the hole 222 with thermoplastic from the thermoplastic piece 120. After the hole 222 is filled with thermoplastic, the ultrasonic energy is terminated and the sonotrode removed 318 as shown in the fourth arrangement or step 50. Because the hole 222 is filled by ultrasonic welding, the thermoplastic forms direct contact with the wall of the hole, filling all the undercut feature(s) in the hole, in this case, the step undercut feature 224, leaving no gaps between the metal piece 220 and the thermoplastic piece 120 to create a weld point 126. After cooling, the weld point 126 integrally connected with the thermoplastic piece 120 provides mechanical interlock to join the thermoplastic piece 120 with the metal piece 220 to form a welded piece. The surface 124 of the weld point 126 is flush with an adjacent lower surface of the metal piece 220 because of the flat anvil 420 employed. The joining of the pieces is in various embodiments further enhanced by applying adhesive between the two dissimilar sheet materials.

The thermoplastic generally refers to a plastic material or polymer that becomes pliable or moldable above a specific temperature and solidifies upon cooling. For example, suitable thermoplastic includes acrylic, acrylonitrile butadiene styrene, polyamide, polylactic acid, polybenzimidazole, polycarbonate, polyether sulfone, polyether ether ketone, polyetherimide, polyethylene, polyphenylene oxide, polyphenylene sulfide, polypropylene, polystyrene, polyvinyl chloride, and polytetrafluoroethylene. The thermoplastic may be reinforced with fibers such as glass, carbon, aramid, or basalt. In the ultrasonic welding process described herein, thermoplastic composite used to join the HMT piece has fibers having length that is less than ⅓ of the diameter of the existing hole of the dissimilar sheet material. The existing hole can have a diameter between about 0.2 mm to 20 mm, for example, between about 0.2 mm to 0.5 mm, between about 0.5 mm to 1 mm, between about 1 mm to 2 mm, between about 2 mm to 5 mm, between about 5 mm to 10 mm, or about between 10 mm and 20 mm. The existing hole can have a depth between about 0.2 mm to 20 mm, for example between about 0.2 mm to 0.5 mm, between about 0.5 mm to 1 mm, between about 1 mm to 2 mm, between about 2 mm to 5 mm, between about 5 mm to 10 mm, or about between 10 mm and 20 mm.

Although metal has been used as the dissimilar sheet material throughout the illustrations and examples in the present disclosure, it is understood that such representation does not limit the HMT piece to metal only. Alternative HMT material such as thermo-set composites and thermoplastic material having a higher melting temperature than the first, thermoplastic workpiece can also be used as the dissimilar sheet material. For example, suitable metal includes aluminum, aluminum alloy, and steel such as stainless steel; suitable thermoset polymers include polyester, polyurethanes, vulcanized rubber, polyoxybenzylmethylenglycolanhydride, urea-formaldehyde, phenol formaldehyde melamine based material, diallyl-phthalate (DAP), epoxy, polyimides, cyanate esters or polycyanurates. The thermoset polymers may be reinforced with fibers such as glass, carbon, aramid, or basalt.

In general, the geometry of the thermoplastic piece is not altered during the process because the ultrasonic energy applied is relatively brief as compared to for example the heat staking process and the amount of the thermoplastic material used to fill the hole is negligible compared to the entire thermoplastic piece used.

The ultrasonic welding technique disclosed herein to join a thermoplastic piece with a HMT thermoplastic piece provides an alternative to existing thermoplastic joining techniques such as fastening (using mechanical fasteners, for instance), adhesive bonding, solvent bonding, co-consolidation, and fusion bonding or welding. In some embodiments, the ultrasonic welding technique disclosed herein can be used in conjunction with such traditional joining techniques, to further strengthen the mechanic interlock between the dissimilar pieces, as mentioned above regarding using an adhesive.

Joints having only one weld point, such as the one illustrated in FIG. 2, can provide a hinge between the two workpieces 120, 220. Two or more weld points create torsional constraint to produce constrained joint, such as that illustrated in FIGS. 7A and 8A.

Referring to FIG. 3A, a cross sectional side view of a thermoplastic piece 130 being welded together with a metal piece 230 using a concave anvil 422 and a sonotrode 442 is shown, illustrating one embodiment of the technology. Upon sonication, thermoplastic from the thermoplastic piece 130 fills a hole 232 of the metal piece 230 and the illustrated concavity or cave in the concave anvil 422 to form a mushroom shaped weld point 134 that joins the two pieces together. While the cave is shown curved or rounded in FIG. 3A, the hole can have other shapes, such as being a squared or more-squared concavity, without departing from the scope of the present technology.

Because the hole 232 is filled with ultrasonic welding, the thermoplastic forms direct contact with the wall of the hole, leaving no gaps between the metal piece 230 and the weld point 134. Besides the binding force between the metal piece and the thermoplastic piece at the stem portion of the weld point 134, the mushroom cap portion of the weld point 134 provides additional mechanical interlock to join the two dissimilar pieces together.

Hole patterns and geometries are designed in various embodiments on any of a multitude of factors. In one embodiment, for instance, hole patterns and geometries are based on the thin and thick gage metal sheets use. For example, holes with undercut features such as a step (e.g., step 224 in FIG. 2), internal thread (e.g. internal thread of FIG. 4A or internal thread 270 of FIG. 4B), or undercuts or void (e.g. undercuts or void 254 of FIG. 5A), can be used for thick metal sheet. Each hole can include more than one undercut features (e.g., thread and step). The step does not necessarily have to be at the bottom of the hole—it can be positioned mid-hole, or anywhere between a top and bottom of the hole, for instance. The undercut features in some embodiments include one or more hole side-wall grooves, depressions, divots, or other selectively shaped void, threading being but one example of such side-wall voids. Generally, each undercut feature is configured to receive thermoplastic material beneath an upper portion, or partial ceiling or shelf, of HMT material, to keep the thermoplastic material, once cooled, from moving up, thereby strengthening the joint formed. While undercut features can be formed by cutting, they can be formed in other ways, so the term undercut is not used to limit the manner which the feature is formed. The undercut features in the holes provide additional mechanical interlock joining the pieces. A flat or concave anvil 420, 422 is used to create weld points having either a flat or mushroom-like head.

Referring to FIG. 3B, a cross sectional side view of a thermoplastic piece 140 being welded together with a first metal piece 234 and a second metal piece 226 using a concave anvil 424 and a sonotrode 444 is shown, illustrating one embodiment of the technology. The technique can be used to connect the thermoplastics piece 140 to more than two HMT pieces. The first metal piece 234 comprises a hole 236 and the second metal piece 226 comprises a hole 228. The first metal piece 234 is stacked with the second metal piece 226 so that the holes 236, 228 align with each other. Upon sonication, thermoplastic from the thermoplastic piece 140 fills the holes 236 and 228 and the cave in the concave anvil 424 to form a mushroom shaped weld point 144 that joins the three pieces together. Because the holes 236, 228 are filled by ultrasonic welding, the thermoplastic forms direct contact with the wall of the holes, leaving no gaps between the metal pieces 234, 226 and the weld point 144. Besides the binding force between the metal pieces and the thermoplastic piece at the stem portion of the weld point 144, the mushroom cap portion of the weld point 144 provides additional mechanical interlock to join the three pieces.

In some embodiments, for joining multiple layers of metal, through holes are created in every layer except for a last layer. In the last layer hole that has internal undercut feature is created, undercut feature such as the step geometry shown at reference 224 of FIG. 2. The hole in the last layer can be a through hole or a blind hole. Upon sonication, thermoplastic from the thermoplastic piece fills the through hole(s) and the step hole to form a weld point that joins the pieces together. Besides the binding force between the metal pieces and the thermoplastic piece at the through hole(s) portion of the weld point, the step hole portion of the weld point provides additional mechanical interlock to join the pieces together.

Alternative hole geometries for varying metal thickness are illustrated in FIGS. 4A-4D. Referring to FIG. 4A, a cross sectional side view of a blind hole 262 with internal thread 264 in a metal piece 260 is shown. During the ultrasonic welding process, the blind hole 262 and the internal thread 264 are filled with thermoplastic from a thermoplastic piece, creating binding force and mechanical interlock to hold the metal piece 260 with the thermoplastic piece.

Referring to FIG. 4B, a cross sectional side view of a through hole 268 with internal thread 270 in a metal piece 266 is shown. During the ultrasonic welding process described herein, the through hole 268 and the internal thread 270 are filled with thermoplastic from a thermoplastic piece, creating binding force and mechanical interlock to hold the metal piece 266 with the thermoplastic piece. The hole geometries of FIGS. 4A and 4B are suitable for thick workpieces, for example workpieces with thickness of >2 mm.

Referring to FIG. 4C, a top view of a hole 274 with a number of extending portions or slots 276 in a metal piece 272 is shown. During the ultrasonic welding process described herein, the through hole 274 and the slots 276 are filled with thermoplastic from a thermoplastic piece, creating binding force to join the metal piece 272 with the thermoplastic piece.

Referring to FIG. 4D, a top view of a 3×3 array of through holes 282 in a metal piece 280 is shown. During the ultrasonic welding process, the through holes 282 are filled with thermoplastic from a thermoplastic piece, creating binding force to join the metal piece 280 with the thermoplastic piece. The arrangement can be configured, and the horn apply energy, so that the holes are filled generally simultaneously, or at various times, such as sequentially by the horn being moved (e.g., slid along the surface of the thermoplastic, or lifted and brought back down) to apply energy to the thermoplastic piece at various areas thereof.

Referring to FIG. 4D1, a cross sectional side view of the metal piece 280 along the 1-1 line of FIG. 4D is shown. The holes 282 may or may not be through holes, parallel to each other.

The hole designs of FIGS. 4C and 4D, especially arrangements wherein the holes are through holes, are suitable for thin workpieces, for example workpieces with thickness of less than or equal to 2 mm.

Figure 5A:
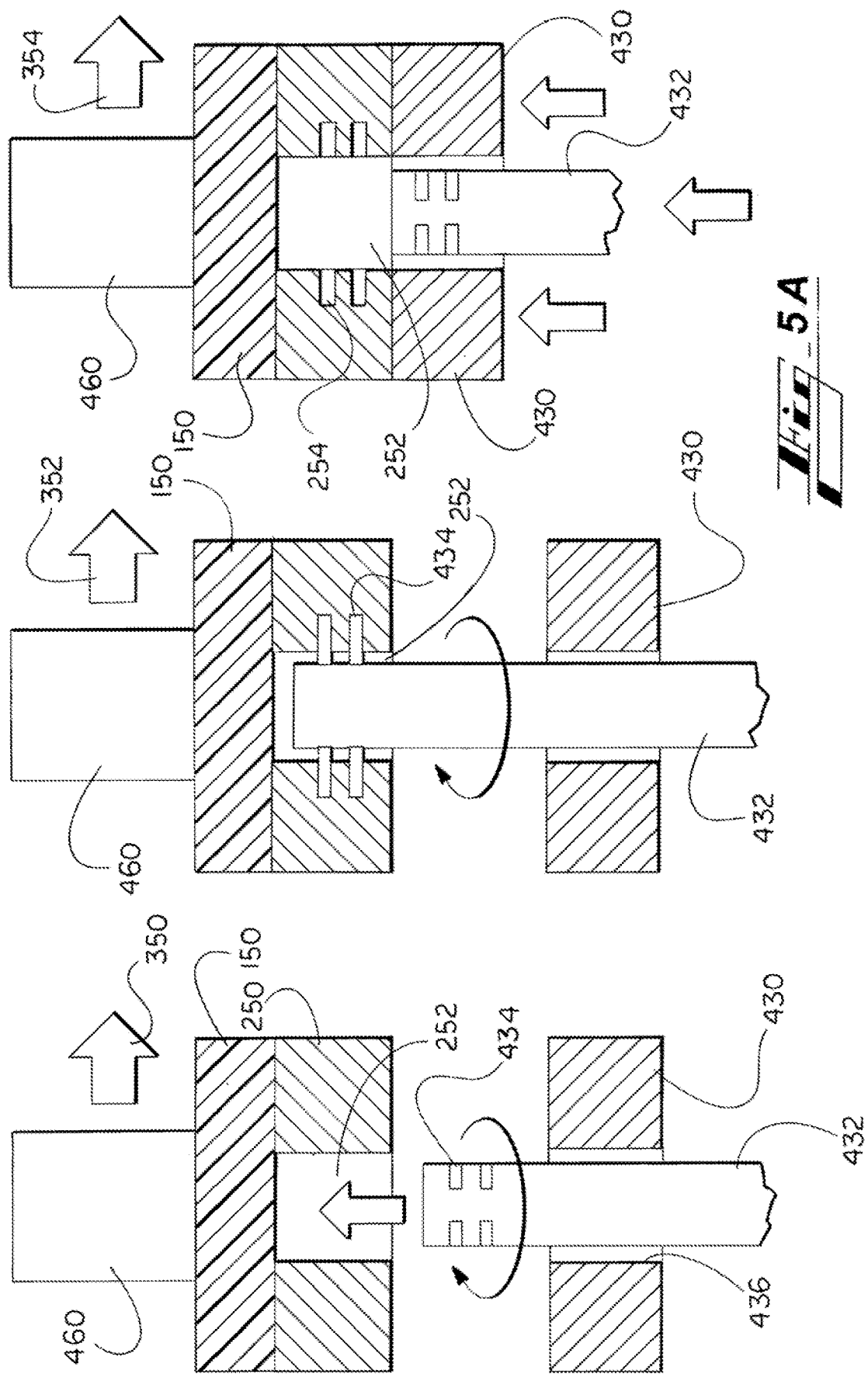
FIG. 5A is a diagram illustrating the first half of a process of using an anvil with an integrated, embedded cutter to make undercuts in a straight un-threaded hole for adding strength in the welded piece.

Referring to FIG. 5A, a diagram illustrating the first half of a process according to one embodiment of the technology to create undercuts is shown. FIG. 5B illustrates the second half of the process of FIG. 5A. A thermoplastic piece 150 is shown to be stacked on top of a metal piece 250 having a straight through hole 252. A sonotrode 460 is shown to be placed directly above the hole 252 on the thermoplastic piece 150. Although the sonotrode 460 and the thermoplastic piece 150 are shown to be stacked on top of the metal piece, the cutting process detailed below does not require these items to be present during the cutting process.

Specifically, An anvil 430 with an integrated, embedded cutter 432 is used to make undercuts 254 in the straight un-threaded hole 252 of the metal piece 250. The undercuts 254 provide added strength to the welded polymer-metal piece through mechanical interlocking joint force. The cutter 432 includes one more retractable cutting inserts 434 is integrated and embedded in anvil 430. The anvil 430 comprises bushing/bearing 436 that allows the cutter 432 to arise and rotate through anvil 430. The metal piece 250 comprises the straight un-threaded through hole 252, which can be premade or created using the cutter 432. In operation 350, the cutter 432 is aligned with the through hole 252 and raised from the anvil 430 to enter the through hole. This can be done with the cutter 432 rotating. Once the retractable cutting inserts 434 portion of the cutter 432 are positioned to make cuts in the metal piece 250, the cutter 432 starts rotating if not already rotating, and the cutting inserts 434 extend out into workpiece to create undercuts 254. Once the undercuts 254 are created, the cutter 432 retracts 352 into the anvil body and the entire anvil 430 moves upwards to provide under-support. In the subsequent ultrasonic process 354, the sonotrode 460 is activated to fill 356 the hole 252 and undercuts 254 with polymer to form a weld point 152. After the removal 358 of the sonotrode 460 and anvil 430, the welded piece 70 is obtained.

The cutter-including anvil 430 is in various embodiments configured so that a top surface of the cutter 432 ends up generally flush with an adjacent cutter surface, as shown in the last view of FIG. 5A, thus forming a flat anvil surface, like that of FIG. 2. In contemplated embodiments, the cutter-including anvil 430 is shaped and sized to, when the cutter 432 is retracted, form a void for creating an additional undercut feature, like that of FIGS. 3A, 3B. This undercut feature can be formed by the anvil hole, in which the cutter 432 moves, being wider (e.g., larger diameter) than the hole 252 of the HMT, and by retracting the top surface of the cutter 432 beneath the adjacent top surface of the cutter-including anvil 430. The cutter 432 could further include a concavity, for forming a mushroom shaped weld point, like the mushroom shaped weld point 134 of FIGS. 3A and 3B.

Although the undercuts 254 are created with an integrated, embedded cutter 432 in the present embodiment, it is understood the embedded cutter and/or the associated anvil is not required to make the undercuts—i.e., the undercuts can be made using other cutting tool or method.

Referring to FIG. 6A, the figure shows a cross sectional side view of a metal piece sandwiched by two thermoplastic pieces to form a double lap joint through applying ultrasonic energy to at least one of the thermoplastic pieces. The metal piece 240 is sandwiched by a first thermoplastic piece 160 and a second thermoplastic piece 162. The metal piece 240 has a hole 242 having a top opening 242a and a bottom opening 242b. A sonotrode 446 is placed on the first thermoplastic piece 160 directly above the top opening 242a of the hole 242 to apply ultrasonic energy to the thermoplastic pieces to fill the hole 242 with molten thermoplastic from both of the thermoplastic pieces. The molten thermoplastic from both thermoplastic pieces meets and fills the entire hole 242 to connect the two thermoplastic pieces. For bottom thermoplastic piece 162, it is believed that the vibrations from the sonotrode 446 travel through the entire system and due to the hole in the metal piece 240, an increased stress is created in the top surface of the bottom thermoplastic piece 162. However instead of forcing the thermoplastic into the metal piece 240, the metal piece 240 is being forced into the thermoplastic piece 162. A pressure gradient is thus created, creating flow of the molten bottom piece 160 into the hole in the metal piece 240. Upon cooling of the polymer, a double lap joint is created with two thermoplastic pieces sandwiching a metal piece. Although no undercut features are shown in FIG. 6A, it is understood the hole in the metal piece 240 can be a through hole with or without undercut features.

To create double lap shear in two independent steps, two sets of holes are drilled to have a step geometry, one set closely grouped and one set spaced out in the dissimilar sheet material. A first thermoplastic sheet material is joined to the dissimilar sheet material using a small horn and closely grouped holes. The entire assembly is then cooled and turned—e.g., flipped over, and then, a second thermoplastic sheet material is joined to the dissimilar sheet material using a large horn and spaced out group of holes. For example, referring to FIG. 6B, a diagram illustrating a side view of a two-step process of a metal piece 244 being sandwiched and joined with two thermoplastic pieces 164 and 166 is shown. The metal piece 244 is sandwiched between the first thermoplastic piece 164 and the second thermoplastic piece 166 to form an assembly 60. The top surface 244a of the metal piece 244 contacts the first thermoplastic piece 164 and the bottom surface 244b contacts the second thermoplastic piece 166. A top cross sectional view of the metal piece 244 along 1-1 line of FIG. 6B is shown in FIG. 6B1. The piece 244 is shown to have a first set of closely grouped holes 246 and a second set of spaced apart holes 248. In the first step, a sonotrode 448 is placed on the first thermoplastic piece 164 directly above the first set of holes 246 to apply ultrasonic energy to the first thermoplastic piece 164 to fill the first set of holes 246 with molten thermoplastic. After the thermoplastic is cooled and set in holes 246, the assembly 60 is flipped 180° and a second sonotrode 450 is placed on the second thermoplastic piece 166 directly above the second set of holes 248 to apply ultrasonic energy to the second thermoplastic piece 166 to fill the second set of holes 248 with molten thermoplastic. The first set of holes 246 are closely grouped and the second set of holes 248 are spaced out. Accordingly, the sonotrode 448 has a smaller diameter than the sonotrode 450 such that the closely group holes 246 are covered entirely under the sonotrode 448 during the first sonication step and the spaced out holes 248 are covered entirely under the sonotrode 450 during second sonication step. Upon cooling of the polymer, a double lap joint is created with two thermoplastic pieces sandwiching a metal piece. Although no undercut features are shown in FIG. 6B, 6B1, it is understood that any of the holes 246, 248 in the metal piece 244 can be a through hole with or without undercut features.

In a contemplated embodiment, the holes have other arrangements, such as there being only one hole in both or one of the groups 246, 248, or by the holes being arranged other than by a close grouped 246 and a spaced group 248.

In another contemplated embodiment, the first group of holes are blind in one direction (e.g., having a bottom in the view of FIG. 6B) and the second group of holes are blind in the opposite direction (e.g., having a top in the view of FIG. 6B). In this manner, the same sized sonotrode—e.g., horn 450—can be used in both steps. The holes can have undercut features, such as threads, to strengthen the connection.

Referring to FIG. 7A, the figure shows a top view of two butting metal halves 290a, 290b with arrays of small holes 292a and 292b. Specifically, metal half 290a comprises a 3×6 array of small through holes 292a and metal half 290b comprises a 3×6 array of small through holes 292b. The ends of the metal halves that contain the arrays of small holes align and abut each other such that the holes 292a, 292b together form an array 292.

Referring to FIG. 7B, the figure shows a cross sectional side view of the two butting metal halves 290a, 290b of FIG. 7A being ultrasonically welded with a thermoplastic piece 180 on a concave anvil 438. Sonotrode 452 is placed directly above and covers the array 292 and the holes 292a, 292b are filled with thermoplastic from thermoplastic piece 180 to form weld points 182. The weld points array collectively has a mushroom cap 184 connecting all the weld points 182, providing additional mechanical interlocking strength to the joined pieces.

EXAMPLES

The following experimental setups are merely examples to illustrate features of the technology, and the invention is not limited to aspects of the examples, unless the features are expressly claimed. The experimental setup includes a process used to join and test 6061 aluminum with short carbon-fiber reinforced thermoplastic (CFRP). The joint was overlapped in the lap-joint configuration. The joint was then put in shear until failure, and the max loads were recorded. The max loads were used to calculate the shear strength of each joint.

Specifically, thin bars of 6061 aluminum were purchased and cut to several samples of dimensions 38.1 mm×127 mm×3.175 mm (W×L×H). A carbon-fiber reinforced Nylon composite material Nylon 66 were injected into mold of 38.1 mm×127 mm×3.175 mm (W×L×H) dimensions to create thermoplastic pieces of identical dimensions and composition. The metal sample piece was then processed to drill holes that will be used for the joining process. Metal sample pieces having 1 hole, 2 holes, 3 holes, and 4 holes were prepared and all the holes has the same size and geometry. Four identical thermoplastic pieces of the same dimensions as the metal piece were used to join the metal pieces following the process described below.

Using the 4 hole metal piece as an example, each hole 296 was at least 12.7 mm center to center from every other hole in the pattern and each pattern was centered 19 mm from either edge at one end of the metal sample piece 294 as shown in FIG. 8A. Each of the holes 296 was of the same undercut geometry shown in FIG. 8A1. Specifically, a portion of a cross sectional side view of FIG. 8A along the 1-1 line is shown in FIG. 8A1. This undercut geometry of the hole 296 was created using an 82° countersink. Each hole 296 was made of a single diameter section of hole that measures 3.175 mm in diameter. This portion of the hole extends half of the thickness of the metal sample piece 294. The remaining thickness of the hole has a varying diameter sections that was created using the 82° countersink. The hole 296 thus has a top opening 296a that is 3.175 mm in diameter and a bottom opening 296b that is 5.944 mm in diameter.

An array of four holes 296 were drilled into the metal sample piece 294. The metal sample piece 294 was then overlaid with a composite sample piece 190 in a lap-joint configurations such that there was a 38.1 mm×38.1 mm overlap between the two pieces. It should be noted that the composite 190 should be the top layer of the assembled system and it should be in contact with the top opening 296a of the drilled metal sample piece holes as denoted in FIG. 8A1. The assembled two pieces was then clamped within a fixture such as those illustrated in FIG. 2 and then bolted in place underneath an ultrasonic horn made of hardened steel that is 19 mm in diameter.

There are six parameters that were set for the ultrasonic process. These six parameters are ultrasonic frequency, weld energy, trigger force, hold time, amplitude % and weld speed. An example of a set of parameters that can be used in shown in Table 1.

Table 1: Welding Parameters used for the four hole pattern shown in FIG. 8B.

TABLE 1

| Welding Parameter | Value |
|---|---|
| Ultrasonic frequency | 15 kHz-30 kHz |
| Weld Energy | 1800 J |
| Trigger Force | 50 lb. |
| Hold Time | 5 sec. |
| Amplitude % | 100% |
| Weld Speed | 0.508 mm/min |

Once the parameters were set, the joining process began. Once the joints were been created, the welded piece was allowed to fully cool for 2 hours to make sure that the excess heat from the joining process does not affect the strength test results. Once the welded piece cooled, it was clamped into a tensile test machine. A photo of the welded piece is shown in FIG. 8B showing the metal piece 294 joined with the thermoplastic piece 190 and the four weld points 298 flush with the surface of the metal piece.

Spacers were used to center the load at the interfaces and reduce any large effects from a bending moment created due to the lap-joint. The tensile test machine then sheared the two pieces apart at an extension rate of 5 mm/min. The load was recorded during this process and the max load is saved for further calculations. The shear area was calculated using the diameter of 296a and multiplied by the number of holes in the pattern. The max load was then divided by the calculated shear area to calculate the shear strength of the joint.

The processes described above were repeated to join each of the 1 hole, 2 hole, and 3 hole metal pieces with an identical thermoplastic piece made above to create welded pieces having 1, 2, and 3 welding points respectively. The welded pieces were then tested following the same testing procedure outlined above to obtain max load and shear strength of the joint. The max load data from all four welded pieces are shown in FIG. 9A and the shear strength of the joint data are shown in FIG. 9B.

Similar experiments were conducted using 3 mm thick short carbon-fiber reinforced thermoplastic (CFRP) and 1 or 3 mm aluminum sheets. The results are shown in Table 2 below.

TABLE 2

| Aluminum sheet (mm) | CFRP thickness (mm) | No. of Hole(s) | Hole diameter (mm) | Max Load (Lap Shear) (N) |
|---|---|---|---|---|
| 1 | 3 | 1 | 3 | 500 |
| 1 | 3 | 2 | 3 | 864 |
| 1 | 3 | 3 | 3 | 1400 |
| 3 | 3 | 3 | 3 | 1397 |

III. ADVANTAGES OF IMPLEMENTATION

Many of the advantage of the present technology are outlined above. Some are described further in this summary.

Benefits include reduced production time and cost. The benefits make ultrasonic welding of dissimilar sheet materials more cost effective, and manufacturing of lightweight parts and products (e.g., vehicles) more cost effective.

Time and cost are saved, for instance, by obviating need for a manufacturing mold to form a boss-bearing thermoplastic piece.

Besides providing alternative processes to join dissimilar sheet materials, the ultrasonic welding process disclosed herein may be used to complement existing process in joining dissimilar sheet materials.

IV. CONCLUSION

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the technology foci (e.g., claims) and as a representative basis for teaching one skilled in the art.

The law does not require and it is economically prohibitive to illustrate and teach every possible embodiment of the present technology foci (e.g., claims). Hence, the above-described embodiments are merely exemplary illustrations of implementations set forth for a clear understanding of the principles of the disclosure. Variations, modifications, and combinations may be made to the above-described embodiments without departing from the scope of the technology foci (e.g., claims). All such variations, modifications, and combinations are included herein by the scope of this disclosure and the following technology foci (e.g., claims).

We claim:

1. A method, of forming a welded component of dissimilar-material pieces by ultrasonic welding, comprising,
   placing a first thermoplastic piece atop a top surface of a higher melting temperate (HMT) piece, wherein the top surface of the HMT piece comprises a first set of holes each having an opening in the top surface, to cover the first set of holes in the HMT piece, and wherein the HMT piece further comprises a second set of holes, each having an opening at a bottom surface of the HMT piece;
   placing a second thermoplastic piece adjacent the bottom surface of the HMT piece, covering the second set of holes in the HMT piece, sandwiching the HMT piece with the first thermoplastic piece;
   applying ultrasonic energy to the thermoplastic piece above the first set of holes of the HMT piece using an ultrasonic horn to melt material of the first thermoplastic piece so that material melted fills the first set of holes of the HMT piece to create a weld point joining the first thermoplastic piece and the HMT piece to form the welded component; and
   applying ultrasonic energy to the second thermoplastic piece below the second set of holes of the HMT piece, so that material of the second thermoplastic piece melts and flows into the second set of holes.

2. The method of claim 1, wherein the first set of holes and the second set of holes has at least one undercut feature and some of the material melted from the first and second thermoplastic pieces fills the undercut feature.

3. The method of claim 2, wherein the at least one undercut feature comprises a step, internal threads, or a combination thereof.

4. The method of claim 1, wherein the method is performed to form a double lap joint to join the first and second thermoplastic pieces and HMT piece of the welded component, wherein:
   the ultrasonic horn is a first ultrasonic horn; and
   applying the ultrasonic energy to the second thermoplastic piece is performed using a second ultrasonic horn having a larger diameter than the first ultrasonic horn.

5. A method, of forming a welded component of dissimilar-material pieces by ultrasonic welding, comprising,
   placing a thermoplastic piece atop a first higher melting temperate (HMT) piece, wherein the HMT piece comprises a first set of holes, to cover the first set of holes in the first HMT piece;
   stacking a second HMT piece comprising a second set of holes with the first HMT piece and aligning the first set of holes with the second set of holes; and
   applying ultrasonic energy to the thermoplastic piece above the first and second set of holes of the first and second HMT pieces to fill all of the holes with material melted from the thermoplastic piece to join the first and second HMT pieces to the thermoplastic piece to create a weld point joining the thermoplastic piece and the first and second HMT pieces to form the welded component.

6. The method of claim 1, wherein the second set of holes are through holes and the melted material of the first thermoplastic piece fills the through holes of the HMT piece to create the weld point joining the first thermoplastic piece and the HMT piece to form the welded component.

7. The method of claim 1, wherein the second set of holes are blind holes and the melted material of the first thermoplastic piece fills the blind holes of the HMT piece to create the weld point joining the first thermoplastic piece and the HMT piece to form the welded component.

8. The method of claim 7, wherein the blind hole comprises at least one undercut feature includes a step, an internal thread, or a combination thereof and the melted material of the thermoplastic piece fills the undercut feature(s) of the blind hole of the HMT piece to create the weld point joining the thermoplastic piece and the HMT piece to form the welded component.

9. A method, for joining dissimilar-material workpieces, comprising:
   positioning a higher melting temperature (HMT) piece adjacent an anvil-cutting apparatus;
   moving a cutter of the apparatus into a hole of the HMT piece;
   extending a cutting insert of the cutter and rotating the cutting insert to form a void in a side wall of the hole;
   retracting the cutting insert;
   retracting the cutter from the hole;
   positioning a thermoplastic piece atop the HMT piece; and
   applying ultrasonic energy to the thermoplastic piece causing material of the thermoplastic piece to melt and move into the hole until the material melted contacts a top of the cutter of the anvil-cutter apparatus, thereby filling the hole and the void formed.

10. The method of claim 9, wherein:
    the anvil-cutter apparatus has a slot in which the cutter is slidably positioned;
    the slot is wider than the hole of the HMT piece;
    retracting the cutter includes retracting the cutter into a body of the cutter-anvil arrangement so that a top surface of the cutter is lower than an adjacent top surface of the body, so that a lower surface of the HMT piece exposed can act as an under-piece feature for receiving material melted from the thermoplastic piece; and
    applying ultrasonic energy to melt the thermoplastic piece to fill a space between sides of the slot, atop the top surface of the cutter, and beneath the under-piece feature formed by the exposed surface of the HMT piece.

* * * * *